US009483624B2

(12) United States Patent
Das et al.

(10) Patent No.: US 9,483,624 B2
(45) Date of Patent: Nov. 1, 2016

(54) METHOD AND APPARATUS FOR CONFIGURING PRIVACY SETTINGS FOR PUBLISHING ELECTRONIC IMAGES

(71) Applicant: GOOGLE TECHNOLOGY HOLDINGS LLC, Mountain View, CA (US)

(72) Inventors: Sujoy Das, Grayslake, IL (US); James M Hunter, San Jose, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/257,022

(22) Filed: Apr. 21, 2014

(65) Prior Publication Data
US 2015/0047050 A1 Feb. 12, 2015

Related U.S. Application Data

(60) Provisional application No. 61/863,092, filed on Aug. 7, 2013.

(51) Int. Cl.
| | |
|---|---|
| *G06F 21/10* | (2013.01) |
| *G06F 21/62* | (2013.01) |
| *H04L 29/06* | (2006.01) |
| *G06K 9/00* | (2006.01) |
| *H04N 1/44* | (2006.01) |
| *H04N 1/00* | (2006.01) |

(52) U.S. Cl.
CPC ........... *G06F 21/10* (2013.01); *G06F 21/6245* (2013.01); *H04L 63/102* (2013.01); *G06F 2221/07* (2013.01); *G06K 9/00221* (2013.01); *G06K 9/00671* (2013.01); *G06K 9/00677* (2013.01); *H04N 1/00153* (2013.01); *H04N 1/00156* (2013.01); *H04N 1/444* (2013.01)

(58) Field of Classification Search
CPC ... G06F 21/10; G06F 21/6245; H04N 1/444; H04N 1/00151; H04N 1/00153; H04N 1/00156; G06K 9/00221; G06K 9/00671
See application file for complete search history.

(56) References Cited

U.S. PATENT DOCUMENTS

| | | | |
|---|---|---|---|
| 8,099,660 B1 | 1/2012 | O'Sullivan et al. | |
| 8,849,819 B2* | 9/2014 | Johnson | 707/732 |
| 2003/0112346 A1 | 6/2003 | Owlett et al. | |
| 2004/0189804 A1 | 9/2004 | Borden et al. | |
| 2007/0106902 A1* | 5/2007 | Miyata | 713/176 |
| 2007/0236505 A1 | 10/2007 | Jung et al. | |
| 2008/0222734 A1 | 9/2008 | Redlich et al. | |
| 2009/0097698 A1 | 4/2009 | Kasahara | |

(Continued)

*Primary Examiner* — Morshed Mehedi
*Assistant Examiner* — Vance Little
(74) *Attorney, Agent, or Firm* — McDermott Will & Emery LLP

(57) ABSTRACT

A method and apparatus configure privacy settings for publishing electronic images. An image including first image content and second image content can be received. A first image content data file can be created for the first image content and a second image content data file can be created for the second image content. A publication privilege can be assigned to the first image content data file. The publication privilege can be based on a relationship between a consumer of the image and a subject of the first image content. The first image content data file with the publication privilege can be stored separate from the second image content data file. Image reconstruction data can be stored. The image reconstruction data can provide information on how to reconstruct the image from the first image content data file and the second image content data file

39 Claims, 7 Drawing Sheets

(56) References Cited

U.S. PATENT DOCUMENTS

| | | |
|---|---|---|
| 2009/0319577 A1 | 12/2009 | Obasanjo et al. |
| 2011/0197255 A1 | 8/2011 | DiCrescenzo et al. |
| 2012/0098999 A1* | 4/2012 | Chen .......................... 348/231.5 |
| 2012/0250951 A1 | 10/2012 | Chen |
| 2012/0284593 A1 | 11/2012 | Rodriguez |
| 2013/0283061 A1 | 10/2013 | Jeong |

\* cited by examiner

METHOD AND APPARATUS FOR CONFIGURING PRIVACY SETTINGS FOR PUBLISHING ELECTRONIC IMAGES

The present application claims the benefit of U.S. Provisional Patent Application Ser. No. 61/863,092, entitled "Method and Apparatus for Configuring Privacy Settings for Publishing Electronic Images" and filed on Aug. 7, 2013.

BACKGROUND

1. Field

The present disclosure is directed to a method and apparatus for configuring privacy settings for publishing electronic images.

2. Introduction

Presently, people use electronic devices to take pictures of other people and publish the pictures electronically. For example, a person who takes a picture of another person can publish the picture electronically by uploading the picture to a social networking website, by sending the picture using multimedia messaging, by sending the picture using electronic mail, by sharing removable storage containing the picture, or by otherwise publishing the picture. Unfortunately, some people do not want their images of themselves published due to modesty or privacy concerns.

Thus, there is a need for a method and apparatus for configuring privacy settings for publishing electronic images.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

Embodiments provide a method and apparatus that configure privacy settings for publishing electronic images. An image including first image content and second image content can be received. A first image content data file can be created for the first image content and a second image content data file can be created for the second image content. A publication privilege can be assigned to the first image content data file. The publication privilege can be based on a relationship between a consumer of the image and a subject of the first image content. The first image content data file with the publication privilege can be stored separate from the second image content data file. Image reconstruction data can be stored. The image reconstruction data can provide information on how to reconstruct the image from the first image content data file and the second image content data file.

Figure 1:
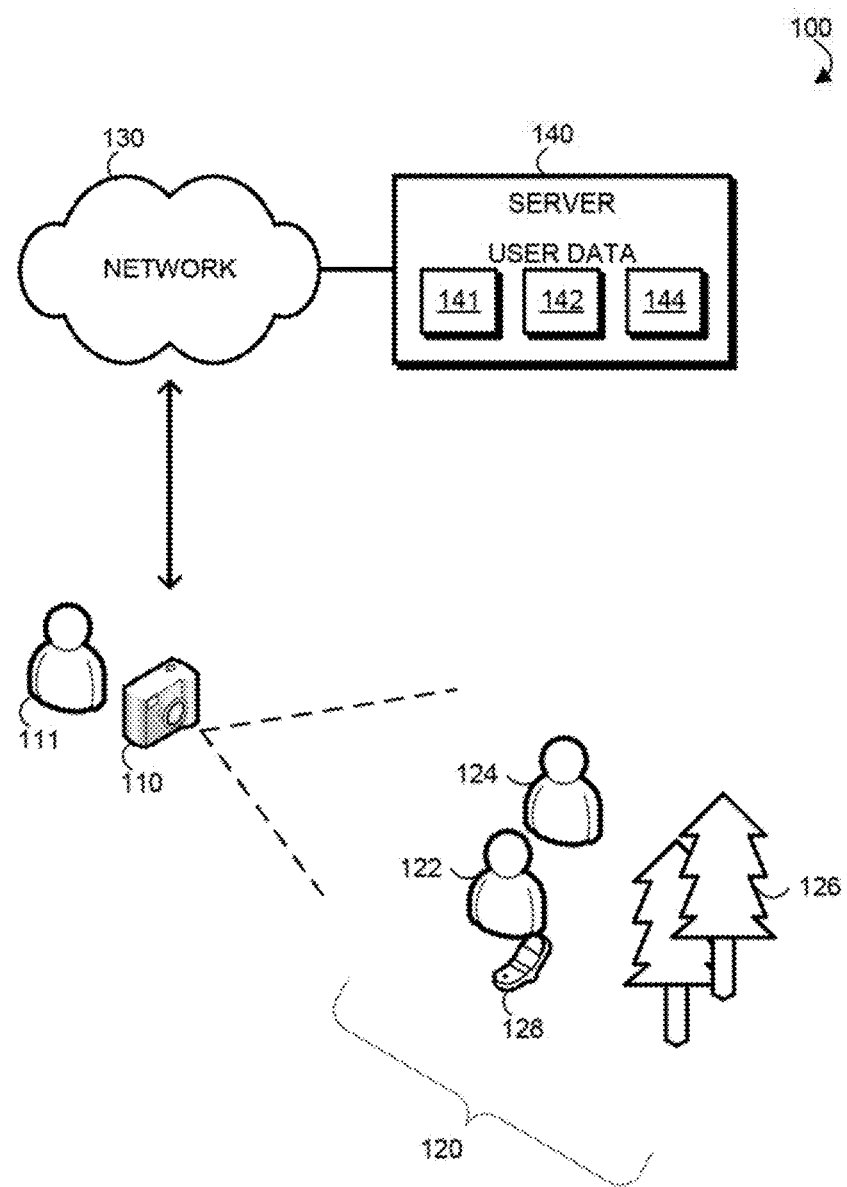
FIG. 1 is an example block diagram of a system according to a possible embodiment.

FIG. 1 is an example block diagram of a system 100 according to a possible embodiment. The system 100 can include an apparatus 110, an apparatus user 111, an image 120, image content, such as a user or person 122, another user or person 124, and/or a background 128. The user 122 can have a device 128 and other users or people in the image 120 can have devices. The system 100 can also include a network 130 and a server 140. The server 140 can include user data 141, 142, and 144. The user data 141, 142, and 144 can also be stored at other locations, such as in the apparatus 110 and/or in the device 128. The user data 141, 142, and 144 can include publication privileges, such as privacy settings and other user data, such as user information and information on the relationships between users. The user data 141, 142, and 144 can be for users 111, 122, and 124, respectively.

The apparatus 110 and/or the device 128 can be wireless terminals. For example, the apparatus 110 and/or the device 128 can be a camera phone, a portable wireless communication device, a camera, a smartphone, a video recorder, a cellular telephone, a personal digital assistant, a personal computer, a selective call receiver, a tablet computer, or any other device that is capable of sending and receiving communication signals on a network. The apparatus 110 can communicate with the network 130, the server 140, the device 128, and other devices using wireless communication signals, such as cellular or wireless local area network communication signals, as well as electrical communication signals, optical communication signals, or other communication signals.

The server 140 can be connected to the network 130. The server 140 may be located at a social network service provider, at a home, at a business, or anywhere else on the network 130. The network 130 may include any type of network that is capable of sending and receiving communication signals. For example, the network 130 may include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, a satellite communications network, a packet-based data network, the Internet, an intranet, a wireless wide area network, a wireless local area network, and other communications systems. The network 130 may include more than one network and may include a plurality of different types of networks. Thus, the network 130 may include a plurality of data networks, a plurality of telecommunications networks, a combination of data and telecommunications networks and other communication systems capable of sending and receiving communication signals.

According to a possible embodiment, the image 120 can be received. For example, the apparatus 110 can receive the image 120 by capturing the image using a camera. According to another possible implementation, the server 140 can receive an upload of the image 120. According to a further possible implementation, the apparatus 110, the server 140, the device 128, or another device can receive a transmission the image 120 or can otherwise receive the image 120. The image 120 can include first image content and second image content. For example, image content can be a person, such as the first person 122 or the second person 124, can be background image content 126, can be an object, can be a trademark, or can be other image content. A first image content data file can be created for the first image content and a second image content data file can be created for the second image content. For example, the apparatus 110, the server 140, or another device can create the image content data files. A publication privilege can be assigned to the first image content data file. The publication privilege can be based on a relationship between a consumer of the image 120 and a subject of the first image content. The image consumer can be a person desiring to view the image, a person taking a picture, a person uploading the image to a server, such as a social networking server, a social networking website, a blog, or any other image consumer that can publish or view the image 120. Assigned publication privilege information can be stored in the first image content data file along with the first image content. The first image content data file with the publication privilege can be stored separate from the second image content data file. Image reconstruction data can also be stored. The image reconstruction data can provide information on how to reconstruct the image from the first image content data file and the second image content data file. For example, the data can be stored at a device or server that created the image content data files and the image reconstruction data, can be stored at a device or server that assigned the publication privileges, can be stored by transmitting the data to another device or server for storage, or can be otherwise stored. The first image content data file and the second image content data file, as well as the image reconstruction data can be stored separately as separate files within one device or server, can be stored at separate locations, and/or can be stored separately as sub-files within a larger file. Different operations can be performed anywhere in the system 100, such as at the apparatus 110, at the server 140, in a cloud, at a viewing location or device, or anywhere else in a system. All of the operations can be performed at one location or different operations can be performed separately at different locations.

According to a possible embodiment, the user 111 can be an authorized user of the apparatus 110, which can have an integrated camera. The person 122 can be part of the user's social network and can authorize the user 111 to take pictures of him. The person 124 can also be part of the user's social network, but may not have authorized the user 111 to take pictures of him. The user 111 can invoke a camera application on the apparatus 110 and can aim the integrated camera so that the person 122 and the person 124 are in a viewfinder of the apparatus 110. The apparatus 110 and the server 140 can perform data processing in real time to determine the image publication authorization states associated with the person 122 and the person 124 in relation to the user 111. For example, the apparatus 110 or the server 140 can implement a facial recognition data analysis module as well as a social network service to determine image publication authorization for the person 122 and the person 124. The apparatus 110 can then display information related to the corresponding authorization states to the user 111.

Once the user 111 takes a picture of the person 122 and the person 124, the apparatus 110 can process the image data and transmit a set of data files to the server 140. The data files can include a data file containing the data associated with an image of the background 126 of the picture, a data file containing the image and authorization state of the person 122, a data file containing the image and authorization state of the person 124, and a data file containing image reconstruction data, such as metadata, on the linkages of the image data files.

If the user 111 decides to view and/or store the captured photo on the apparatus 110, the photo can include the person 122 and the background 126. However, the image of the person 124 may be missing or blurred because the person 124 has not given publication authorization to the user 111. When the set of data files is received by the server 140, a controller, such as a data processing module, can assign a unique link to each of the image data files. The data files can then be stored in one or more databases. Information related to the link associated with the data file of the person 122 can be sent to a computing device, such as the device 128, of the person 122 and information related to the link associated with the data file of the other person 124 can be sent to a computing device of the other person 124.

If members of the social network decide to view the photo, the photo can include the background as well as the image of the person 122, while the image of the other person 124 can be missing or blurred. At a later point in time, if the person 122 or the person 124 changes their authorization states, the server 140 can update the photo by first accessing the metadata file and then updating the data file containing the image and authorization state of the person 122 and/or the data file containing the image and authorization state of the person 124.

According to another possible embodiment, the user 111, the person 122, and the person 124 can be members of a social network. Authorization states indicating if the user 111 is allowed to take a picture of the other people 122 and 124 can be defined and stored at a memory location at the server 140, such as in user data 141, 142, and 144. A software application residing in the apparatus 110 can be coupled to a camera module on the apparatus 110 and coupled to the server 140. The user 111 can invoke the software application and the camera application or can invoke the camera application via the software application.

Real-time extraction and processing of location data can be performed by the software application and the server 140 to determine if one or more members of a social network of the user 111 are within a predefined proximity of the user 111. For example, if the people 122 and 124 are in the social network of the user 111, data related to the authorization states for each of the individuals can be extracted, such as from the user data 141, 142, and 144. Then, when the user 111 aims a camera of the apparatus 110 at one or more of the people 122 and 124, the facial images of the individuals who are in the camera's field of view can be analyzed by the software application and/or the server 140 to determine if any of the individuals are members of the social network of the user 111. If so, the associated authorization states can be stored in a memory of the apparatus 110. The authorization states can also be visually presented to the user 111 via the apparatus 110 in real time. The operations can be applied dynamically as individuals move in and out of the camera's field of view based on the user 111 changing the camera direction. Then, if the user 111 takes a picture of one or more of the people 122 and 124, the software application can apply filtering to the image data, such as blocking or blurring, of the individuals who are members of the social network of the user 111 and who have not authorized the user 111 to take their picture. After taking the picture, the resulting image can be stored in the apparatus 110 and can be uploaded to the server 140, such as a social networking site.

Members of a social network of the user 111 who are determined to be within a predetermined proximity of the user 111 can change their authorization states on an ad-hoc basis. For example, once the person 122 is determined to be close to the user 111 and the person 122 has authorized reception of notifications from the social networking service, the person 122 can receive information regarding the intent of the user 111 to take their picture. If the user 111 has not been authorized to take the picture of the person 122, the person 122 can be prompted to temporarily change his authorization state. This change can be valid for a predefined period of time. Also, this change can expire once an individual is no longer within the predefined proximity of the user 111.

Figure 2:
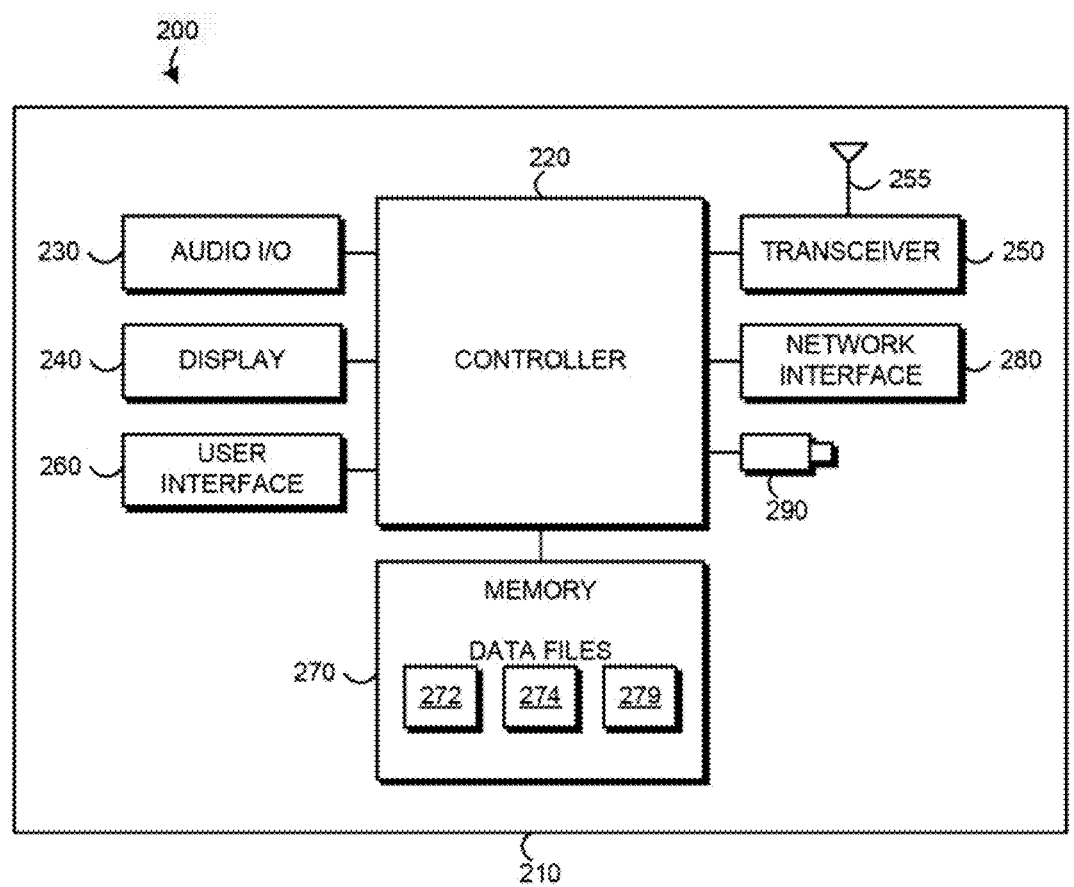
FIG. 2 is an example block diagram of an apparatus according to a possible embodiment.

FIG. 2 is an example block diagram of an apparatus 200, such as the apparatus 110, according to a possible embodiment. The apparatus 200 can include a housing 210, a controller 220 within the housing 210, audio input and output circuitry 230 coupled to the controller 220, a display 240 coupled to the controller 220, a transceiver 250 coupled to the controller 220, an antenna 255 coupled to the transceiver 250, a user interface 260 coupled to the controller 220, a memory 270 coupled to the controller 220, a network interface 280 coupled to the controller 220, and an image capture device 290 coupled to the controller 220. The apparatus 200 can perform the methods described in all the embodiments.

The display 240 can be a viewfinder, such as a liquid crystal display (LCD), a light emitting diode (LED) display, a plasma display, a projection display, a touch screen, or any other device that displays information. The transceiver 250 may include a transmitter and/or a receiver. The audio input and output circuitry 230 can include a microphone, a speaker, a transducer, or any other audio input and output circuitry. The user interface 260 can include a keypad, a keyboard, buttons, a touch pad, a joystick, a touch screen display, another additional display, or any other device useful for providing an interface between a user and an electronic device. The image capture device 290 can be a camera, a video camera, a webcam, an electronic image sensor, or any other image capture device. The network interface 280 can be a universal serial bus port, an Ethernet port, an infrared transmitter/receiver, an IEEE 1394 port, or any other interface that can connect an apparatus to a network or computer and that can transmit and receive data communication signals.

The memory 270 can include a random access memory, a read only memory, an optical memory, a subscriber identity module memory, a flash memory, a removable memory, a hard drive, a cache, or any other memory that can be coupled to a wireless communication device. The memory 270 can include data files 272, 274, and 279. The data file 272 can be a first image content data file. The data file 274 can be a second image content data file. The data file 279 can include image reconstruction data.

The apparatus 200 or the controller 220 may implement any operating system, such as Microsoft Windows®, UNIX, or LINUX, Android, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 270 or elsewhere on the apparatus 200. The apparatus 200 or the controller 220 may also use hardware to implement operations. For example, the controller 220 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 220 may be any controller or processor device or devices capable of operating an electronic device and implementing the disclosed embodiments.

In operation, an image receiver can receive an image, such as the image 120. For example, the image capture device 290 can receive an image by capturing an image, the network interface 280 can receive an image by receiving a transmission or file transfer of the image, and/or the transceiver 250 can receive an image by receiving a transmission of the image. The image can include first image content and second image content. The first image content can be a first image of a person who is a member of a social network. The second image content can be an image of another person, an object, or a background image. The image can also include additional image content.

The controller 220 can create a first image content data file 272 for the first image content and a second image content data file 274 for the second image content. According to a possible implementation, the controller 220 can detect the first image content and the second image content in the received image. The controller 220 can create the first image content data file based on the detected first image content and can create the second image content data file based on the detected second image content.

The controller 220 can assign a publication privilege to the first image content data file 272. The publication privilege can be based on a relationship between a consumer of the image and a subject of the first image content. The publication privilege can be based on privacy settings of a person who is the subject of the first image content. The privacy settings can indicate whether the person authorizes publication of their image. For example, the privacy settings can indicate whether the person authorizes publication of their image by another person who uploads the image to a social network. The controller 220 can also assign publication privileges to other image content data files if other image content is present in the image. The controller 220 can assign the publication privilege by assigning a first unique link to the first image content data file 272 and a second unique link to the second image content data file 274.

According to a possible implementation, the controller 220 can receive publication authorization information, such as via the transceiver 250 or via the network interface 280. The controller 220 can assign the publication privilege to the first image content data file 272 based on the received publication authorization information. The controller 220 can also receive updated publication privilege information for the first image content or other image content and can assign an updated publication privilege to the first image content data file 272 or other image content data files based on the updated publication privilege information.

According to another possible implementation, the controller 220 can determine the publication privilege. For example, the controller 220 can perform image recognition on the first image content and other image content and can determine the publication privilege by determining the publication privilege of the first image content based on the image recognition. According to another example, the controller 220 can retrieve, over the network 130, the publication privilege of the first image content and can assign the retrieved publication privilege to the first image content data file. The controller 220 can retrieve the publication privilege of the first image content based on image recognition. Furthermore, the controller 220 can determine a position of the apparatus 200 and can retrieve, over the network 130, the publication privilege of the first image content based on a subject of the first the first image content being proximal to the apparatus 200.

The controller 220 can display information based on the publication privilege of the first image content in an image capture device viewfinder, such as the display 240, prior to capturing the image. The controller 220 can also obscure the first image content in the viewfinder based on the publication privilege of the first image content prior to capturing the image, such as if the publication privilege indicates the apparatus 200 or the user 111 is not authorized to publish the first image content.

If the publication privilege indicates the apparatus 200 or the user 111 of the apparatus 200 is not authorized to publish the first image content, the controller 220 can send a request for publication authorization to a device, such as the device 128, of a subject of the first image content and can receive publication authorization in response to sending the request. The controller 220 can automatically send the request if the publication privilege indicates the apparatus 200 is not authorized to publish the first image content or a user 111 can instruct the controller 220 to send the request after viewing the displayed publication privilege information. The publication authorization can be a temporary publication authorization. For example, the received publication authorization can be a temporary publication authorization by expiring after a predetermined time period, by expiring after a subject of the first image content or the subject's device moves a predetermined distance away from the apparatus 200, or by expiring for any other reason. The controller 220 can then determine the publication privilege of the first image content by determining the apparatus 200 or the user 111 has an authorized publication privilege to publish the first image content based on the received publication authorization.

The controller 220 may capture the image using the image capture device 290 before or after determining the publication privilege. The controller 220 can then create the first image content data file 272 for the first image content create the second image content data file 274 for the second image content based on the captured image.

The controller 220 can store the first image content data file 272 with the publication privilege separate from the second image content data file 274. For example, the controller 220 can store first image content data file 272 with the publication privilege separate from the second image content data file 274 locally in a database, such as in the memory 270, or remotely, such as at the server 140.

The controller 220 can store image reconstruction data 279 on how to reconstruct the image from the first image content data file 272 and the second image content data file 274. For example, the controller 220 can store the image reconstruction data 279 in an image reconstruction data file 279 locally in the memory 270 or remotely, such as at the server 140. The stored image reconstruction data can include the first unique link and the second unique link. For example, the image reconstruction data can include metadata of the linkages of the first image content data file 272 and the second image content data file 274.

The controller 220 can reconstruct the image based on the image reconstruction data 279. The first image content can be obscured in the reconstructed image based on the publication privilege of the first image content data file 272 restricting publication of the first image. For example, if the publication privilege information indicates the apparatus 200 or a user of the apparatus 200 is not authorized to publish or view the first image content, the controller 220 can obscure the first image content on the display 240. As another example, the controller 220 can upload, via the transceiver 250 or the network interface 280, the image content data files 272 and 274 and the image reconstruction data 279 to the server 140. The controller 220 at the apparatus 200, or a controller on another device, such as the device 128, can download the image content data files 272 and 274 and the image reconstruction data 279 from the server 140. If the publication privilege information indicates the apparatus 200 or a user of the apparatus 200 is not authorized to publish or view the first image content, the controller 220 can obscure the first image content on the display 240. Also, if the publication privilege information indicates the apparatus 200 or a user of the apparatus 200 is not authorized to publish or view the first image content, the controller 220 may not be able to download the first image content data file 272.

Figure 3:
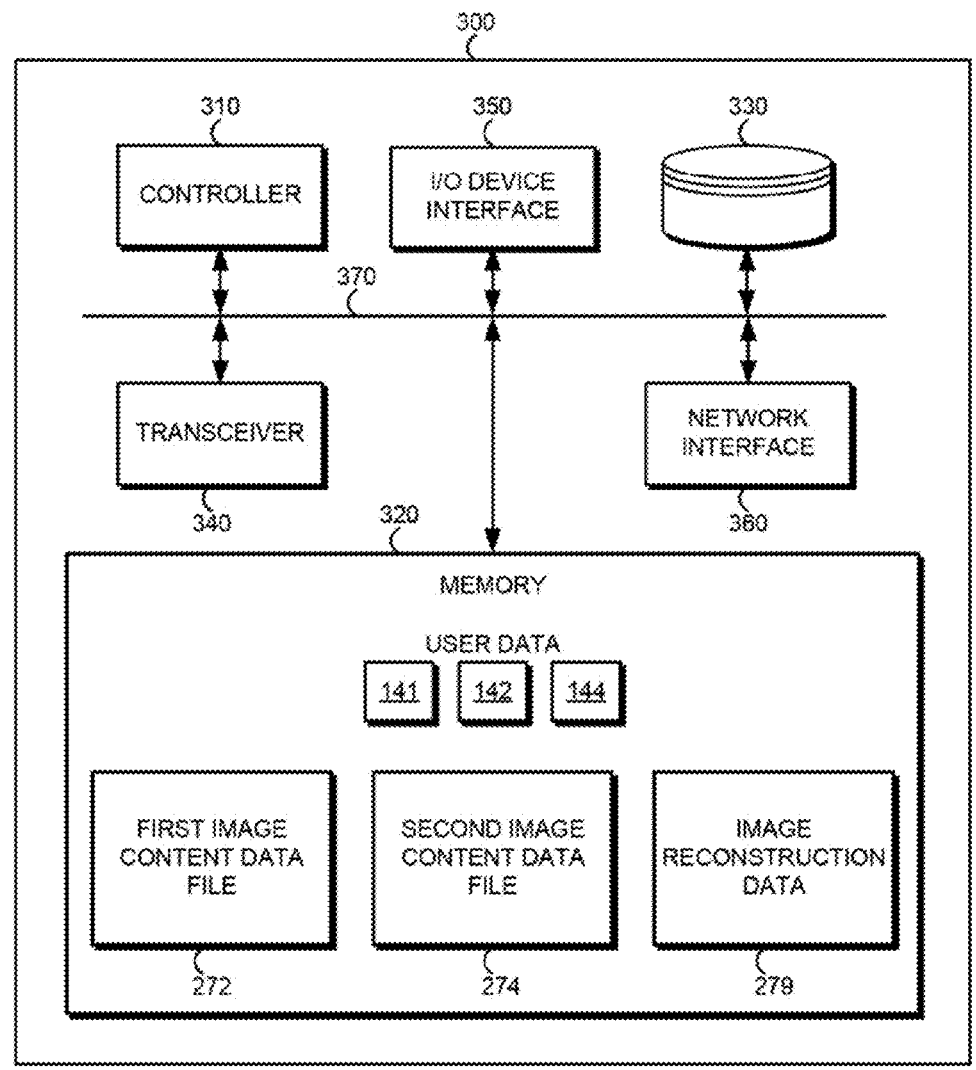
FIG. 3 is an example block diagram of a server according to a possible embodiment.

FIG. 3 is an example block diagram of a server 300, such as the server 140, according to a possible embodiment. The server 300 may include a controller 310, a memory 320, a database interface 330, a transceiver 340, Input/Output (I/O) device interface 350, a network interface 360, and a bus 370. The server 300 may implement any operating system, such as Microsoft Windows®, UNIX, or LINUX, for example. Base station operation software may be written in any programming language, such as C, C++, Java or Visual Basic, for example. Server software may run on an application framework, such as, for example, a Java® server, a .NET® framework, or any other application framework. The software and/or the operating system may be stored in the memory 320 or elsewhere on the server 300. The server 300 or the controller 310 may also use hardware to implement operations. For example, the controller 310 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or other devices that can implement the disclosed embodiments.

As a further example, embodiments can be implemented using computer-executable instructions, such as program modules, being executed by an electronic device, such as a general purpose computer. Generally, program modules can include routine programs, objects, components, data structures, and other program modules that perform particular tasks or implement particular abstract data types. The program modules may be software-based and/or may be hardware-based. For example, the program modules may be stored on computer readable storage media, such as hardware discs, flash drives, optical drives, solid state drives, CD-ROM media, thumb drives, and other computer readable storage media that provide non-transitory storage aside from a transitory propagating signal. Moreover, embodiments may be practiced in network computing environments with many types of computer system configurations, including personal computers, hand-held devices, multi-processor systems, microprocessor-based or programmable consumer electronics, network personal computers, minicomputers, mainframe computers, and other computing environments.

The memory 320 may include volatile and nonvolatile data storage, including one or more electrical, magnetic, or optical memories, such as a Random Access Memory (RAM), a cache, a hard drive, or other memory device. The memory 320 may also be connected to a Compact Disc-Read Only Memory (CD-ROM), Digital Video Disc-Read Only memory (DVD-ROM), DVD read write input, tape drive, thumb drive, or other removable memory device that allows media content to be directly uploaded into a system. Data may be stored in the memory 320 or in a separate database. For example, the database interface 330 may be used by the controller 310 to access the database. The memory 320 or a database can include user data 141, 142, and 144. The memory 320 or a database can also include the first image content data file 272, the second image content data file 274, and the image reconstruction data 279.

The I/O device interface 350 may be connected to one or more input and output devices that may include a keyboard, a mouse, a touch screen, a monitor, a microphone, a voice-recognition device, a speaker, a printer, a disk drive, or any other device or combination of devices that accept input and/or provide output. The transceiver 340 can send and receive communication signals. The network connection interface 360 may be connected to a communication device, modem, network interface card, a transceiver, or any other device capable of transmitting and receiving signals to and from an apparatus or device, such as the apparatus 111, via the network 130. The components of the server 300 may be connected via the bus 370, may be linked wirelessly, or may be otherwise connected.

In operation, an image receiver, such as the transceiver 340 or the network interface 360, can receive an image, such as the image 120. The image can include first image content and second image content. The first image content can be an image of a person who is a member of a social network.

The controller 310 can create a first image content data file 272 for the first image content and a second image content data file 274 for the second image content. Alternately the received image may already include the separate data files. The controller 310 can assign a publication privilege to the first image content data file 272 or the publication privileges may already be assigned to received files. The publication privilege can be based on a relationship between a consumer of the image and a subject of the first image content. The publication privilege can also be based on privacy settings of a person who is the subject of the first image content. The privacy settings can indicate whether the person authorizes publication of their image. The controller 310 can store the first image content data file 272 with the publication privilege separate from the second image content data file 274. The controller 310 can store image reconstruction data 279 on how to reconstruct the image from the first image content data file 272 and the second image content data file 274. The controller 310 can also implement other operations of the methods described below. For example, some operations can be performed by the server 300 and other operations can be performed by the apparatus 200.

Figure 4:
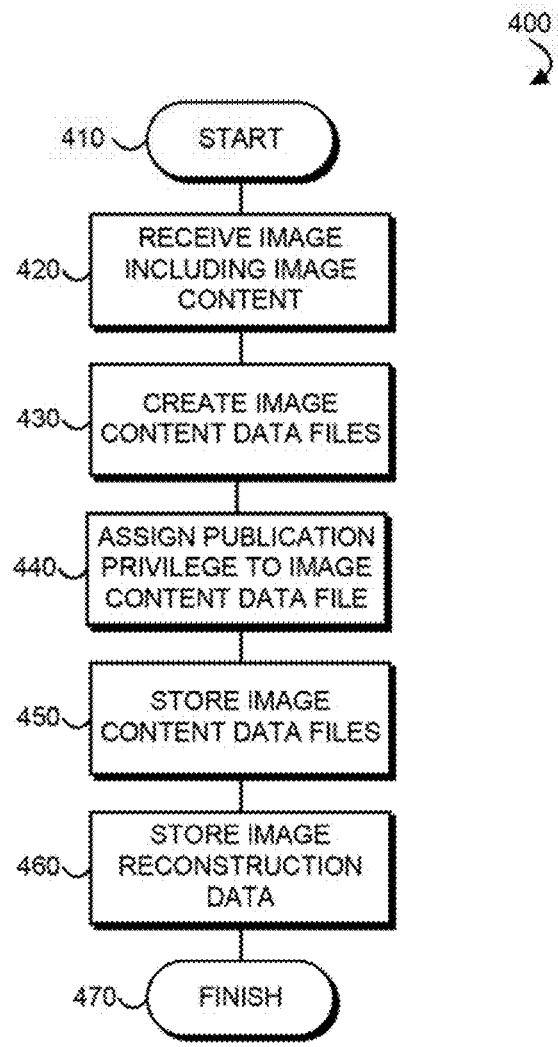
FIG. 4 is an example flowchart illustrating the operation of an apparatus and/or a server according to a possible embodiment.

FIG. 4 is an example flowchart 400 illustrating the operation of the apparatus 110 and/or the server 140 according to a possible embodiment. At 410, the flowchart 400 can begin.

At 420, an image including first image content and second image content can be received. The image can be received by capturing the image using an image capture device, such as a camera on the apparatus 110, by receiving an upload of the image, such as at the server 140, by receiving a transmission of the image, or by otherwise receiving the image. The first image content can be an image of a person, such as the person 122, who is a member of a social network. The second image content can be a second image of a person or can be other image content. For example, the second image content can be a background image, other objects in the image, or other image content. The image can also include additional image content, such as additional people, object content, background content, or other image content. Additional image content data files may be created for the additional image content. The image can be captured after determining a publication privilege.

At 430, a first image content data file can be created for the first image content and a second image content data file can be created for the second image content. For example, image content data files can be created based on a captured or received image. At 440, a publication privilege can be assigned to the first image content data file. For example, a publication privilege retrieved from the server 140 can be assigned to the first image content data file 272. Publication privileges can also be assigned to additional image content data files if there are additional people or objects in the image. A publication privilege can be based on a relationship between a consumer of the image and a subject of the first image content. The publication privilege can be based on privacy settings of the person who is the subject of the first image content. The privacy settings can indicate whether the person authorizes publication of their image. For example, the privacy settings can indicate who is authorized to display a user's image, can indicate who is authorized to view a user's image, can indicate where the user's image can be published, and can indicate other privacy settings regarding publication of a user's image. As a further example, the privacy settings can indicate whether a subject person authorizes publication of their image by a user who uploads the image to the social network. Furthermore, assigning a publication privilege can include determining the publication privilege of at least the first image content at an apparatus. The publication privilege of at least the first image content can be determined based on image recognition. The publication privilege of at least the first image content can be determined prior to or after capturing an image at 420.

According to a possible implementation, assigning a publication privilege can include assigning a first unique link to the first image content data file and a second unique link to the second image content data file. The first unique link can also be sent to a device or account associated with a person who is the subject of the first image content. If other people are present in the image, links associated for other image content data files can be sent to devices or accounts associated with the other people.

At 450, the first image content data file with the publication privilege can be stored separate from the second image content data file. For example, the first image content data file and the second image content data file can be stored in at least one database or in separate databases. At 460, image reconstruction data can be stored. The image reconstruction data can be stored in an image reconstruction data file 279. The image reconstruction data can include information on how to reconstruct the image from the first image content data file and the second image content data file. The image reconstruction data can also include metadata on linkages of the first image content data file to the second image content data file. For example, the stored image reconstruction data can include the first unique link and the second unique link described above. According to a possible implementation, a user may download an image content data file and/or the corresponding link to a device only if the user or their device has authentication to access the data file and/or the link. At 470, the flowchart 400 can end.

Figure 5:
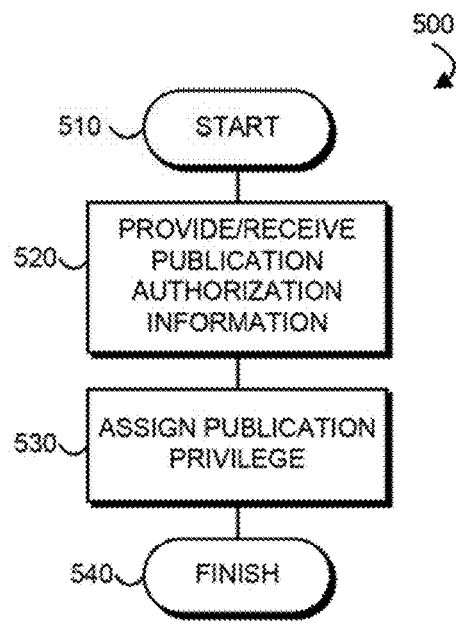
FIG. 5 is an example flowchart illustrating the operation of an apparatus and/or a server according to a possible embodiment.

FIG. 5 is an example flowchart 500 illustrating the operation of the apparatus 110 and/or the server 140 according to a possible embodiment. At 510, the flowchart 500 can begin.

At 520, publication authorization information can be provided to a device associated with a user who uploads the image to the social network. For example, the apparatus 110 can retrieve over the network 130 the publication privilege of the first image content. As a further example, the publication authorization information can be provided from the server 140, such as a social network server, to the apparatus 110. A device can be determined to be associated with a user based on information stored on the device, based on information at a server, based on the user using the device to access a service, based on the user logging into a social networking service from the device, based on information in the image, or based on other information that associates a device with a user. As an additional example, the apparatus 110 can retrieve the publication privilege of the first image content based on a subject of the first the first image content being proximal to the apparatus 110. Updated publication privilege information for the first image content can also be received from a user and provided to the apparatus 110.

At 530, the retrieved publication privileged or the updated publication privilege can be assigned to the first image content data file. For example, at a later point in time, a person who is the subject of image data content can change their authorization state and corresponding data file can be updated with the updated publication privilege. The subject person can change their authorization state by authorizing publication of their image, by revoking publication authorization, or by otherwise changing their authorization state, such as by changing their privacy settings on a social network. At 540, the flowchart 500 can end.

Figure 6:
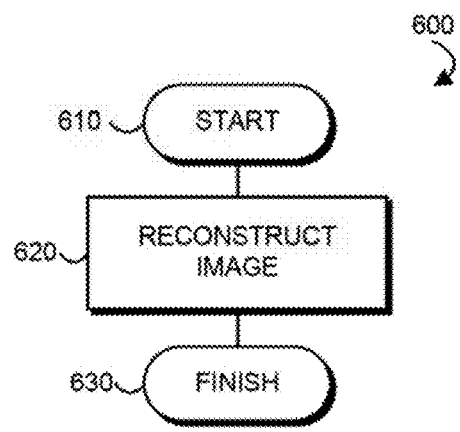
FIG. 6 is an example flowchart illustrating the operation of an apparatus and/or a server according to a possible embodiment.

FIG. 6 is an example flowchart 600 illustrating the operation of the apparatus 110 and/or the server 140 according to a possible embodiment. At 610, the flowchart 600 can begin. At 620, an image can be reconstructed based on the image reconstruction data, such as the image reconstruction data 279. When reconstructing the image, the first image content can be obscured in the reconstructed image based on the publication privilege of the first image content data file restricting publication of the first image. For example, the publication privilege may indicate the person who uploaded the image to a social network is not authorized to publish the first image content. The publication privilege may also indicate that a user or device is not authorized to view or display the first image content. At 630, the flowchart 600 can end.

Figure 7:
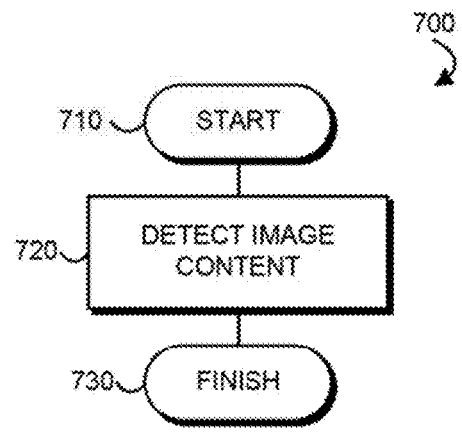
FIG. 7 is an example flowchart illustrating the operation of an apparatus and/or a server according to a possible embodiment.

FIG. 7 is an example flowchart 700 illustrating the operation of the apparatus 110 and/or the server 140 according to a possible embodiment. At 710, the flowchart 700 can begin.

At 720, the first image content can be detected in a received image. Additional image content can also be detected in the received image. If image content is detected, the first image content data file and other image content data files can be created based on the detected image content. For example, image content can be detected by performing image recognition. Image recognition can be facial recognition, recognition of image content based on image characteristics, recognition of image content based on image patterns, or other image recognition. At 730, the flowchart 700 can end.

Figure 8:
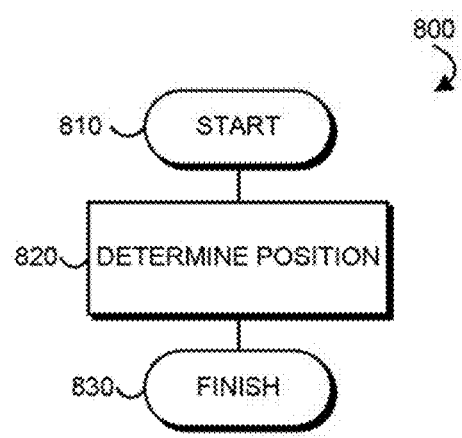
FIG. 8 is an example flowchart illustrating the operation of an apparatus and/or a server according to a possible embodiment.

FIG. 8 is an example flowchart 800 illustrating the operation of the apparatus 110 and/or the server 140 according to a possible embodiment. At 810, the flowchart 800 can begin. At 820, a position of the apparatus 110 can be determined. For example, a position of the apparatus 110 can be determined using global positioning system information, using wireless local area network position information, using deduced reckoning, or using any other method of determining a position of an apparatus. A subject of the first the first image content can be proximal to the apparatus 110 by being within range for the apparatus 110 to take a picture of the subject. Real-time extraction and processing of location data can be performed by a software application on the apparatus 110 and/or the server 140, such as a cloud server, in order to determine if one or more members of a device user's social network are within a predefined proximity of the apparatus 110. If the members are proximal to the apparatus 110, publication privileges, such as data related to authorization states, for each proximal person can be extracted. According to a possible implementation, the proximity of the subjects can also be determined in a cloud, such as at the server 140, by obtaining individual positions of the subjects, such as the people 122 and 124, with respect to the apparatus 110. The individual positions can be determined using global positioning system information, using wireless local area network position information, using deduced reckoning, or using any other method of determining a position of a person or a device carried by the person. Accordingly, publication authentication information can be provided to the apparatus 110 before the subjects actually appear on a viewfinder of the apparatus 110. At 830, the flowchart 800 can end.

Figure 9:
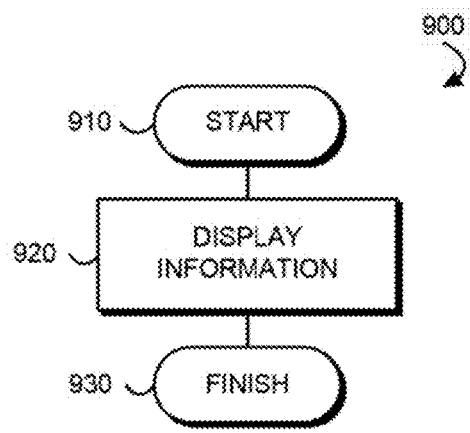
FIG. 9 is an example flowchart illustrating the operation of an apparatus and/or a server according to a possible embodiment.

FIG. 9 is an example flowchart 900 illustrating the operation of the apparatus 110 and/or the server 140 according to a possible embodiment. At 910, the flowchart 900 can begin. At 920, information based on the publication privilege of the first image content can be displayed in an apparatus viewfinder prior to capturing the image. For example, the publication privilege information can be presented by obscuring the first image content in an apparatus viewfinder based on an unauthorized publication privilege of the first image content prior to capturing the image. Image content can be obscured by blurring, blocking, or otherwise obscuring the image content if a user of a device is not authorized to take, publish, or view a person's picture. Publication information can also be displayed as text or can otherwise be displayed in an apparatus viewfinder. At 930, the flowchart 900 can end.

Figure 10:
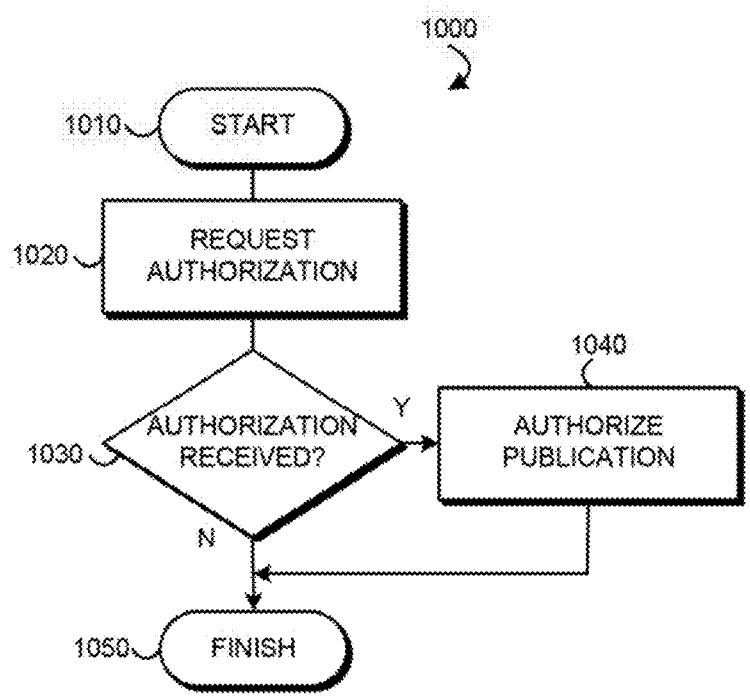
FIG. 10 is an example flowchart illustrating the operation of an apparatus and/or a server according to a possible embodiment.

FIG. 10 is an example flowchart 1000 illustrating the operation of the apparatus 110 and/or the server 140 according to a possible embodiment. At 1010, the flowchart 1000 can begin. At 1020, a request for publication authorization can be sent to a device of a subject of the first image content. For example, a publication authorization request can be sent to the device 128. At 1030, a determination can be made as to whether publication authorization is received in response to sending the request. If authorization is received, at 1040, the apparatus 110 can be determined to have an authorized publication privilege to publish the first image content based on the received publication authorization. The publication authorization can be a temporary publication authorization. For example, the publication authorization can be a temporary publication authorization by expiring after a predetermined time period, by expiring after a subject of the first image content or the subject's device moves a predetermined distance away from the apparatus 110, or by expiring for any other reason. At 1050, the flowchart 1000 can end.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the system 100.

Embodiments can provide for handling authorization associated with various entities a picture. The authentication of the entities can be defined based on their relationship with various individuals in a people network. Blurring or graining can define a relationship between a consumer of a picture and a subject in the picture. A consumer may only be able to download and view the entities on which the consumer has rights. Pre-processing can be performed in real time on viewfinder frames, such as by generating individual data links, much before the actual picture capture. Content can be made blurry on the viewfinder itself after doing a facial recognition of a subject and a relationship between the subject and the user taking the picture can be determined. The picture itself might or might not have the actual content hidden in the metadata. Once the authorization is given, the meta-data can be updated and contents can be viewed securely by the intended users. Content can be blurred by determining whether a face has any relationship with the subject who is consuming or who is viewing the picture. An authentication relationship between the entities in the picture and the viewer can be defined. The relationship can be related to a people network. Embodiments can provide for authentication based content generation as well as authentication based content consumption. Authentication can be inserted into an image or image content data between a time a viewfinder frame catches the subject to a time when the actual picture is viewed by someone.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method comprising:
   determining a publication privilege of first image content while the first image content and second image content is in a field of view of an image capture device;
   capturing with the image capture device an image comprising the first image content and the second image content after determining the publication privilege;
   creating a first image content data file for the first image content and a second image content data file for the second image content;
   assigning the publication privilege to the first image content data file, where the publication privilege is based on a relationship between a consumer of the image and a subject of the first image content;
   storing the first image content data file with the publication privilege separate from the second image content data file; and
   storing image reconstruction data on how to reconstruct the image from the first image content data file and the second image content data file.

2. The method according to claim 1,
   wherein the first image content comprises an image of a person who is a member of a social network, and
   wherein the publication privilege is based on privacy settings of the person, where the privacy settings indicate whether the person authorizes publication of their image.

3. The method according to claim 2, wherein the privacy settings indicate whether the person authorizes publication of their image by a user who uploads the image to the social network.

4. The method according to claim 3, further comprising providing publication authorization information to a device associated with a user who uploads the image to the social network.

5. The method according to claim 1, further comprising reconstructing the image based on the image reconstruction data, where the first image content is obscured in the reconstructed image based on the publication privilege of the first image content data file restricting publication of the first image.

6. The method according to claim 1, further comprising:
receiving updated publication privilege information for the first image content; and
assigning an updated publication privilege to the first image content data file based on the updated publication privilege information.

7. The method according to claim 1,
wherein assigning a publication privilege comprises assigning a first unique link to the first image content data file and a second unique link to the second image content data file,
wherein storing the first image content data file comprises storing the first image content data file and the second image content data file in at least one database, and
wherein the stored image reconstruction data includes the first unique link and the second unique link.

8. The method according to claim 1, wherein storing image reconstruction data comprises storing the image reconstruction data in an image reconstruction data file, where the image reconstruction data includes metadata on linkages of the first image content data file to the second image content data file.

9. The method according to claim 1,
wherein the first image content comprises a first image of a person and the second image content comprises a second image of a person, and
wherein assigning a publication privilege comprises assigning a first publication privilege to the first image content data file and a second publication privilege to the second image content data file.

10. The method according to claim 1, further comprising detecting the first image content,
wherein creating the first image content data file comprises creating the first image content data file based on the detected first image content.

11. The method according to claim 1,
wherein determining a publication privilege further comprises determining, at an apparatus, the publication privilege of at least the first image content,
wherein the image capture device is on the apparatus, and
wherein creating comprises creating a first image content data file for the first image content and a second image content data file for the second image content based on the captured image.

12. The method according to claim 11, further comprising performing image recognition at the apparatus,
wherein determining the publication privilege comprises determining the publication privilege of at least the first image content based on the image recognition.

13. The method according to claim 11, further comprising retrieving over a network, by the apparatus, the publication privilege of the first image content,
wherein assigning comprises assigning the retrieved publication privilege to the first image content data file.

14. The method according to claim 13, further comprising determining a position of the apparatus,
wherein retrieving comprises retrieving, over a network, by the apparatus, the publication privilege of the first image content based on a subject of the first the first image content being proximal to the apparatus.

15. The method according to claim 13, further comprising performing image recognition on the first image content at the apparatus,
wherein retrieving comprises retrieving, over a network, by the apparatus, the publication privilege of the first image content based on the image recognition.

16. The method according to claim 11, further comprising displaying information based on the publication privilege of the first image content in an apparatus viewfinder prior to capturing the image.

17. The method according to claim 11, further comprising obscuring the first image content in an apparatus viewfinder based on the publication privilege of the first image content prior to capturing the image.

18. The method according to claim 11, further comprising:
sending a request for publication authorization to a device of a subject of the first image content; and
receiving publication authorization in response to sending the request,
wherein determining the publication privilege of at least the first image content comprises determining the apparatus has an authorized publication privilege to publish the first image content based on the received publication authorization.

19. The method according to claim 18, where the publication authorization is a temporary publication authorization.

20. An apparatus comprising:
an image receiver configured to receive an image including first image content and second image content from an image capture device; and
a controller coupled to the image receiver,
the controller configured to determine a publication privilege of the first image content while the first image content and the second image content is in a field of view of the image capture device;
the controller configured to capture the image after determining the publication privilege;
the controller configured to create a first image content data file for the first image content and a second image content data file for the second image content,
the controller configured to assign the publication privilege to the first image content data file, where the publication privilege is based on a relationship between a consumer of the image and a subject of the first image content,
the controller configured to store the first image content data file with the publication privilege separate from the second image content data file, and
the controller configured to store image reconstruction data on how to reconstruct the image from the first image content data file and the second image content data file.

21. The apparatus according to claim 20,
wherein the first image content comprises an image of a person who is a member of a social network, and
wherein the publication privilege is based on privacy settings of the person, where the privacy settings indicate whether the person authorizes publication of their image.

22. The apparatus according to claim 21, wherein the privacy settings indicate whether the person authorizes publication of their image by another person who uploads the image to the social network.

23. The apparatus according to claim 22,
wherein the controller is configured to receive publication authorization information, and
wherein the controller is configured to assign the publication privilege to the first image content data file based on the received publication authorization information.

24. The apparatus according to claim 20,
wherein the controller is configured to receive updated publication privilege information for the first image content, and
wherein the controller is configured to assign an updated publication privilege to the first image content data file based on the updated publication privilege information.

25. The apparatus according to claim 20, wherein the controller is configured to reconstruct the image based on the image reconstruction data, where the first image content is obscured in the reconstructed image based on the publication privilege of the first image content data file restricting publication of the first image.

26. The apparatus according to claim 20,
wherein the controller is configured to assign a publication privilege by assigning a first unique link to the first image content data file and a second unique link to the second image content data file,
wherein the controller is configured to store the first image content data file by storing the first image content data file and the second image content data file in at least one database, and
wherein the stored image reconstruction data includes the first unique link and the second unique link.

27. The apparatus according to claim 20, wherein the controller is configured to store image reconstruction data by storing the image reconstruction data in an image reconstruction data file, where the image reconstruction data includes metadata of the linkages of the first image content data file and the second image content data file.

28. The apparatus according to claim 20,
wherein the first image content comprises a first image of a person and the second image content comprises a second image of a person, and
wherein the controller is configured to assign a publication privilege by assigning a first publication privilege to the first image content data file and a second publication privilege to the second image content data file.

29. The apparatus according to claim 20,
wherein the controller is configured to detect the first image content and the second image content in the received image, and
wherein the controller is configured to create the first image content data file based on the detected first image content and create the second image content data file based on the detected second image content.

30. The apparatus according to claim 20, wherein the image receiver comprises the image capture device,
wherein the controller is configured to capture the image using the image capture device, and
wherein the controller is configured to create the first image content data file by creating the first image content data file for the first image content and is configured to create a second image content data file for the second image content based on the captured image.

31. The apparatus according to claim 30,
wherein the controller is configured to perform image recognition on the first image content, and
wherein the controller is configured to determine the publication privilege by determining the publication privilege of the first image content based on the image recognition.

32. The apparatus according to claim 30,
wherein the controller is configured to retrieve, over a network, the publication privilege of the first image content, and
wherein the controller is configured to assign a publication privilege by assigning the retrieved publication privilege to the first image content data file.

33. The apparatus according to claim 32,
wherein the controller is configured to determine a position of the apparatus, and g publication privilege of the first image content based on a subject of the first the first image content being proximal to the apparatus.

34. The apparatus according to claim 32,
wherein the controller is configured to perform image recognition on the first image content, and
wherein the controller is configured to retrieve by retrieving, over a network, the publication privilege of the first image content based on the image recognition.

35. The apparatus according to claim 30, further comprising an image capture device viewfinder,
wherein the controller is configured to display information based on the publication privilege of the first image content in the image capture device viewfinder prior to capturing the image.

36. The apparatus according to claim 30,
wherein the controller is configured to send a request for publication authorization to a device of a subject of the first image content and configured to receive publication authorization in response to sending the request, and
wherein the controller is configured to determine the publication privilege of at least the first image content by determining the apparatus has an authorized publication privilege to publish the first image content based on the received publication authorization.

37. The apparatus according to claim 36, where the publication authorization is a temporary publication authorization.

38. The apparatus according to claim 30, further comprising a viewfinder coupled to the controller,
wherein the controller is configured to obscure the first image content in the viewfinder based on the publication privilege of the first image content prior to capturing the image.

39. An apparatus comprising:
a camera configured to capture an image including first image content and second image content;
a controller configured to determine a publication privilege of at least the first image content while the first image content and the second image content is in a field of view of the camera,
configured to display information based on the publication privilege of at least the first image content prior to capturing the image;
configured to create a first image content data file for the first image content and a second image content data file for the second image content based on the captured image,
configured to assign a publication privilege to the first image content data file, where the publication privilege is based on a relationship between a consumer of the image and a subject of the first image content,
configured to store the first image content data file with the publication privilege separate from the second image content data file, and
configured to store image reconstruction data on how to reconstruct the image from the first image content data file and the second image content data file.

* * * * *